United States Patent
Ivinson et al.

(10) Patent No.: US 8,783,997 B2
(45) Date of Patent: Jul. 22, 2014

(54) STRESS REDUCING TOOL MOUNT

(71) Applicant: ECA Medical Instruments, Newbury Park, CA (US)

(72) Inventors: David Ivinson, Camarillo, CA (US); John Nino, Simi Valley, CA (US)

(73) Assignee: ECA Medical Instruments, Newbury Park, CA (US)

( * ) Notice: Subject to any disclaimer, the term of this patent is extended or adjusted under 35 U.S.C. 154(b) by 0 days.

(21) Appl. No.: 13/633,241

(22) Filed: Oct. 2, 2012

(65) Prior Publication Data
US 2013/0272786 A1    Oct. 17, 2013

Related U.S. Application Data

(60) Provisional application No. 61/566,439, filed on Dec. 2, 2011.

(51) Int. Cl.
*F16D 1/072*    (2006.01)

(52) U.S. Cl.
USPC ............................ 403/361; 403/280; 403/282

(58) Field of Classification Search
USPC ................. 403/1, 361, 379.6, 375, 280, 282; 81/177.85, 423
See application file for complete search history.

(56) References Cited

U.S. PATENT DOCUMENTS

| | | | | |
|---|---|---|---|---|
| 3,369,265 A | * | 2/1968 | Halberstadt et al. | 15/22.1 |
| 3,399,911 A | * | 9/1968 | Reisch | 403/329 |
| 3,730,109 A | * | 5/1973 | Kreizel et al. | 108/156 |
| 3,858,368 A | * | 1/1975 | Cocherell et al. | 451/490 |
| 3,872,691 A | * | 3/1975 | Hildebrandt | 464/87 |
| 4,033,703 A | * | 7/1977 | Slater | 408/211 |
| 4,832,573 A | * | 5/1989 | Dorski | 416/241 A |
| 5,152,631 A | * | 10/1992 | Bauer | 403/372 |
| 5,347,892 A | * | 9/1994 | Moetteli | 81/177.85 |
| 5,421,556 A | * | 6/1995 | Dodge et al. | 256/1 |
| 5,485,769 A | * | 1/1996 | Olson et al. | 81/177.85 |
| 7,004,671 B2 | * | 2/2006 | Tawara et al. | 403/341 |
| 7,281,310 B2 | * | 10/2007 | Moore et al. | 29/456 |
| 8,132,990 B2 | * | 3/2012 | Bauman | 408/239 R |
| 2011/0180773 A1 | * | 7/2011 | Pacheco | 256/21 |
| 2013/0272786 A1 | * | 10/2013 | Ivinson et al. | 403/361 |

FOREIGN PATENT DOCUMENTS

GB    2099904 A    *    12/1982    ............. F16B 21/10

* cited by examiner

*Primary Examiner* — Joshua Kennedy
(74) *Attorney, Agent, or Firm* — Baker Hostetler LLP

(57) ABSTRACT

A plastic tool mount and system with a tool connector head with a back side, nose and distal end of the nose; a shaft guide having a channel is formed within the head open at the distal end of the nose; the channel further having a raised bump section of plastic extending from a wall of the shaft guide into the shaft guide channel; and, wherein the diameter of the shaft guide channel at the location of the raised bump is diminished.

13 Claims, 3 Drawing Sheets

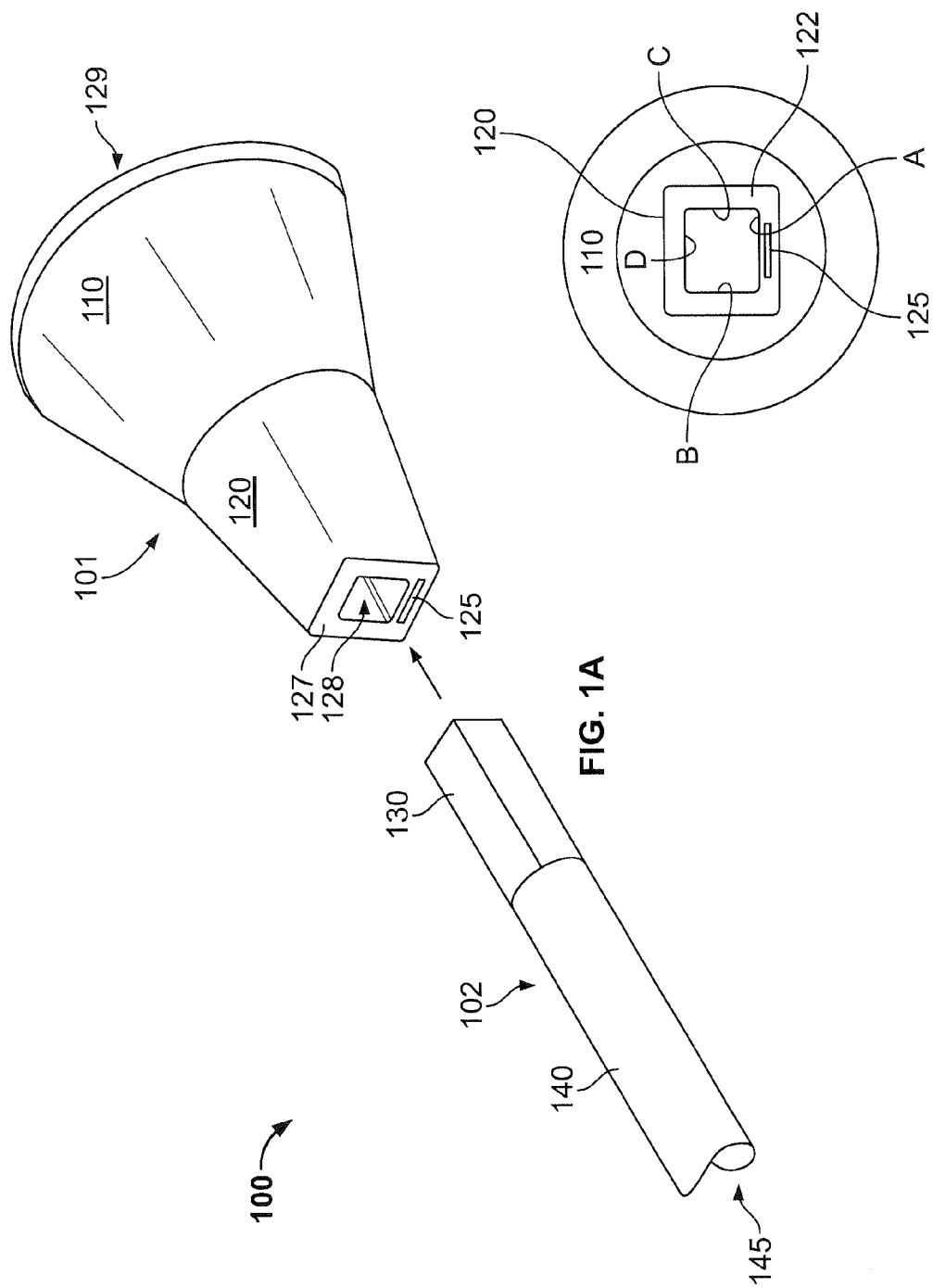

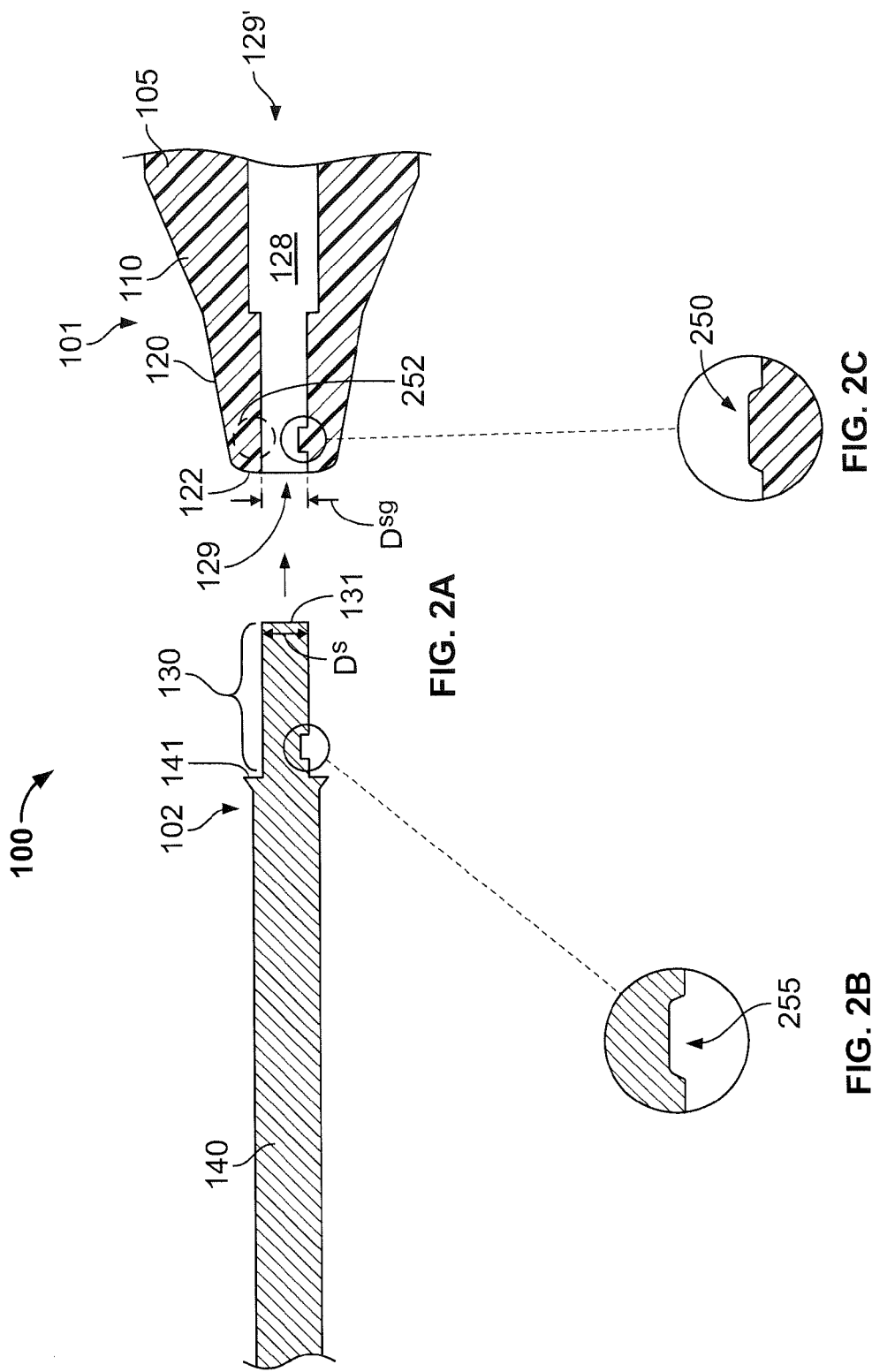

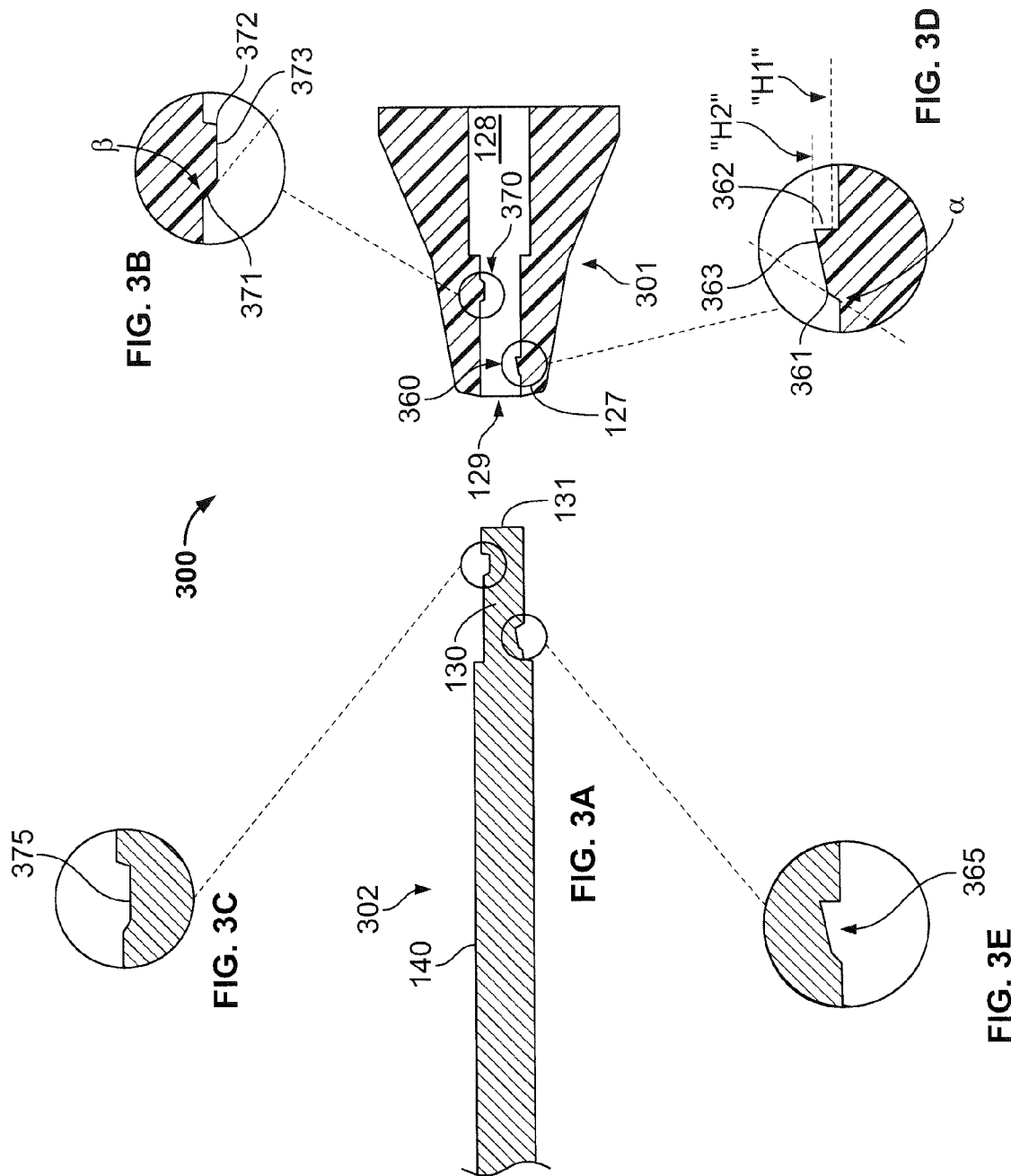

STRESS REDUCING TOOL MOUNT

RELATED APPLICATIONS

This application claims the benefit of and priority to U.S. Provisional Application Ser. No. 61/566,439 filed on Dec. 2, 2011 which is incorporated by reference herein, as if fully set forth in its entirety.

BACKGROUND

1. Field

This disclosure relates to a tool mount with reduced stress applied to a plastic mount.

2. General Background

Tools such as screwdrivers, drills and socket wrenches have traditionally provided a mounting means to replace or swap out a shaft or a shaft with a tool on a remote end (i.e. a screwdriver or hex wrench).

Pressure fits, locking collars and moving ball bearings have all been used to hold or latch a shaft to a handle or device.

When pressure or friction fitting a shaft into a plastic receiving guide, the insertion of the shaft produces pressure on the walls of the guide whereby the guide may become distressed, have reduced usable life, crack or otherwise fail. Insert molding or co-molding a metal shaft into a plastic mount is expensive and reduce the variability of being able to select tools to fit in a standardized mount.

SUMMARY

According to aspects of one or more exemplary implementations, disclosed is a tool mount and mounting system having a plastic tool connector head with a nose and back side, a generally square shaft guide with four orthogonal walls and an open distal end formed within said head, a square shaft with a diameter less than said shaft guide, a raised section of plastic extending from a wall of said shaft guide into the shaft guide channel whereby a portion of the shaft guide channel is diminished; a tool with a metal shaft having a free end and said shaft being of a diameter less than said shaft guide but greater than said diminished shaft guide channel; and, upon insertion of said free end into the shaft guide channel said raised section is distorted, having no catch or well to retain it, forming a spread-out area of plastic fitted against said shaft.

According to aspects of one or more exemplary implementations, disclosed is a tool mount and system having a plastic tool connector head with a back side, nose and distal end of said nose; a shaft guide formed within said head open at the distal end of said nose, a shaft with a diameter less than said shaft guide; and, a raised section of plastic extending from a wall of said shaft guide into the shaft guide channel; and, wherein the diameter of the shaft guide channel at the location of the raised bump is diminished.

According to aspects of one or more exemplary implementations, disclosed is a tool mounting system with a plastic tool connector head with a back side and a nose; a generally square shaft guide with four orthogonal walls formed within said head and opening at the distal end of the nose; a square shaft with a diameter less than said shaft guide; a first raised section of plastic extending from a first wall of said shaft guide into the shaft guide channel whereby a portion of the shaft guide channel is diminished; a second raised section of plastic extending from a second wall of said shaft guide into the shaft guide channel whereby a portion of the shaft guide channel is diminished; a tool with a metal shaft having a free end and said shaft being of a diameter less than said shaft guide but greater than said diminished shaft guide channel, and, upon insertion of said free end into the shaft guide channel said raised sections are distorted, having no catch or well to retain them, forming a spread-out area of plastic fitted against said shaft.

DRAWINGS

The above-mentioned features of the present disclosure will become more apparent with reference to the following description taken in conjunction with the accompanying drawings wherein like reference numerals denote like elements and in which:

FIGS. 1A and 1B show a front view and front perspective view of some aspects of a shaft and mounting guide in a portion of a device;

FIG. 2A shows a cut away side component view of a shaft and device with mounting guide;

FIG. 2B shows an enlarged view of a portion of the shaft of FIG. 2A;

FIG. 2C shows an enlarged view of a portion of the guide of FIG. 2A;

FIG. 3A shows a cut away side component view of a shaft and device with mounting guide;

FIG. 3B shows an enlarged view of a portion of the shaft of FIG. 3A;

FIG. 3C shows an enlarged view of a portion of the shaft of FIG. 3A;

FIG. 3D shows an enlarged view of a portion of the guide of FIG. 3A; and,

FIG. 3E shows an enlarged view of a portion of the guide of FIG. 3A.

While the specification concludes with claims defining the features of the present disclosure that are regarded as novel, it is believed that the present disclosure's teachings will be better understood from a consideration of the following description in conjunction with the appendices, figures, in which like reference numerals are carried forward. All descriptions and callouts in the Figures are hereby incorporated by this reference as if fully set forth herein.

FURTHER DESCRIPTION

According to one or more exemplary implementations, as shown in FIGS. 1A and 1B, a shaft and mount 100 are disclosed. Tool connector head 101 mates with tool 102. Tool connector 101 is a roughly conical element with a back side 105, an annular base 110, with a nose 120 extended therefore.

Those of ordinary skill in the art will recognize that the back side may be affixed to a more complex structure. For example, as taught in U.S. Pat. No. 7,938,046 owned by the common assignee to the present application, the backside may support a bearing surface with gear teeth to be incorporated into a torque limiting device. The backside may also have a guide channel that communicates through the tool connector. In other instances, the back side 105 may be extended to from a handle.

Nose 120 has a front wall 122 from which an alignment feature 125 extends. The alignment extension may also be formed as a wall, or be a pad stamped color, or sticker or other visual indicator. The alignment feature may be a tactile or visual cue which provides information on orientation of the tool connector. Such orientation information used in concert with a shaft guide 128 having one or more mounting features along one or more of the four orthagonal walls (A, B, C and D) which comprise the sides of the shaft guide 128 thereby allowing a user to identify a position to orient the shaft guide relative to a shaft 130. Those of ordinary skill in the art will recognize that a greater or fewer number of walls may be utilized, forming triangular openings, or polygonal openings in the distal end 127 of the nose, at the first opening 129 of the shaft guide 128.

Shaft 130 of tool 102 mates into shaft guide 128. The shaft is preferably constructed of a material with greater hardness than the nose. In some instances, metal is preferred. In other instances, where the number of use cycles does not require metal, plastic, resin or composite materials may be sufficient. The tool 102 has an elongated member 140 which may terminate into a preselected end 145, such as a tip of a screwdriver, a cutting blade, or a mount junction to attach other tools. An annular lip 141 is formed at the junction of the elongated member and the shaft, whereby entry of the shaft 130 into the shaft guide 128, via the square opening 129 of the shaft guide 128, is limited.

FIG. 2A through 2C show further mounting details of a tool connector head 101 and tool 102 mated with one another. A bump or raised section 250 is formed on one of the four orthogonal walls of the shaft guide 128, the shaft guide 128 forming a shaft guide channel. The channel having a first opening 129 at the nose's distal front end 127 and a second opening 129 communicating through said back side 105.

The raised section is of a preselected height, width and length. It may be as wide as spanning between to opposing walls or merely be a local raised section on a wall not touching other walls. The raised section produces a section of diminished diameter for the section of the shaft guide channel opposite the raised section.

Shaft 130 provides a well 255 into which said raised section 250 fits. The diameter $D^s$ of the shaft 130 is preselected to be less than the diameter $D^{sg}$ of the shaft guide 128. The size and shape of well 255 is of a size and shape to accommodate said raised section 250. Upon inserting said shaft into said shaft guide, the free end 131 of the shaft 130 will encounter the raised section 250 within the shaft guide. The metal shaft free end 131 must be pushed over the raised section 250 to be fitted into the shaft guide. The raised section 250 is preferably molded of the same material as the nose. It is preferable that the nose and raised section 250 are molded of a material which is softer than said shaft. Accordingly, when the end of the shaft encounters the raised section, it deforms the raised bump to accommodate the shaft. Such shaft is constructed of a material with sufficient hardness to deform the raised bump or a portion thereof. Preferably, the raised section is constructed of a material that has adequate memory to provide that a substantial portion of said material ("the remainder") will return to a raised orientation after deformation by said shaft, forming a latch, and said latch will be retained within a catch formed by said well 255.

The raised bumps have a first and a second wall and a top. In some instance at least one of the walls connection or edge at or with the top is a radiused corner, in other instances both wall connections to the top are radiused.

To reduces stress on the entire nose 120 and shaft guide 128, shaft 130 is freely movable within said shaft guide 128, but for the raised section. Therefore, the shaft exerts force at raised section 250 and the area of the shaft guide and nose 252 above the raised section 250.

Once the shaft 130 is fully inserted in the nose the annular lip 141 of the elongated member should reach the front wall 122 and the raised section 250 should be aligned with the a well 255 which acts as a catch for said raised section 250 which acts as a latch. In those instances, when the passage of the shaft 130 over the raised section 250 degrades or removes a portion of the raised section 250, sufficient residual raised section 250 material should be left to hold the shaft in place for a limited use disposable tool.

Those of ordinary skill in the art will recognize that in some instances, a shaft may not have a well therein to catch said raised bump latch. In those instances, the metal shaft via the shaft and free end push against said raised section and stress the plastic bump to deform, reshape and relocated at least some of said raised bump material, wherein the increase in material within the shaft guide channel is sufficient to reduce the diameter of a portion of the shaft guide channel whereby pressure or friction fitting the shaft is provided. Because only a portion of the shaft guide channel has decreased diameter, less stress is placed on the shaft guide channel as a whole.

A limited use shaft guide is preferable to sufficiently secure a shaft for at least about 50 uses; more preferably it will secure the shaft for at least about 100 uses, and most preferably it will secure a shaft for at least about 200 uses. A "use" as used herein refers to the application from a start to stop of rotational force on the shaft. Said force may be 360 degrees or any part thereof. A use also includes reversing of direction. Specifically, a one degree or more turn clockwise, and a one or more degree reverse turn counterclockwise would constitute two uses.

FIG. 3A through 2D show some aspects of mounting details of a tool connector head 301 and tool 302 mating with one another. In this exemplary implementation, two latch-catch pairs are shown. The disclosure of two latch-catch pairs at 180 degree separation is not a limitation. In some instances, only one of the latch-catch configurations may be used. In other instances, said latch-catch pairs may be placed at a 90 degree orientation to one another.

A bump or raised section 360 is formed on one of the four walls of a shaft guide 128. The raised section is of a pre selected height, width and length. As detailed in FIG. 3D, the raised section may have an angled first side wall 361 wherein angle α is obtuse (greater than 90 degrees) and a second side wall 362 which is at generally 90 degrees. Further, the top 363 of the raised section may be angled relative to the shaft guide 128, wherein the height "H1" at the intersection of a first side wall 361 to the top 363, and the height "H2" at the intersection of a second side wall 362 to the top 363, are dissimilar.

A bump or raised section 370 is formed on one of the four walls of a shaft guide 128. The raised section is of a pre selected height, width and length. As detailed in FIG. 3C, the raised section may have an angled first side wall 371 wherein angle β is obtuse (greater than 90 degrees) and a second side wall 372 which is at generally 90 degrees. Further, the top 373 of the raised section may be flat and generally parallel relative to the shaft guide 128.

While the method and apparatus have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A tool mounting system comprising:
a plastic tool connector head with a nose and back side;
a generally square shaft guide with four orthogonal walls and an open distal end formed within said head;
a raised section of a plastic bump extending from a wall of said shaft guide into the shaft guide whereby a portion of the shaft guide near the location of the raised section is diminished;
a tool with a metal square shaft having a free end and said shaft being of a diameter less than said shaft guide but greater than said diminished shaft guide; and,
whereby upon insertion of said free end into the shaft guide a portion of said raised section is removed by the free end, forming a pressure fit between the residual of the plastic bump, shaft guide and shaft.

2. The tool mounting system of claim 1, further comprising a well in said shaft that catches and retains residual raised section.

3. The tool mounting system of claim 2, wherein the raised section has a first and a second substantially flat side wall and a substantially flat top.

4. The tool mounting system of claim 3, wherein said first and second side walls of the raised section are generally perpendicular to the wall of the shaft guide they extend from.

5. The tool mounting system of claim 3, wherein at least one of said first and second side walls has a radiused edge wherein it meet said top.

6. The tool mounting system of claim 2, wherein the raised section has a first and a second substantially flat side wall and angled top.

7. The tool mounting system of claim 6, wherein at least one of said first and second side walls has a radiused edge wherein it meet said top.

8. The tool mounting system of claim 2, wherein at least one of said first and second side walls is at an obtuse angle to said shaft guide channel wall.

9. The tool mounting system of claim 2 further comprising a visual queue formed on the distal end of said nose indicating an orientation for alignment of a shaft with said shaft guide channel.

10. The tool mounting system of claim 1, wherein the shaft is harder than the raised section of plastic.

11. A tool mounting system comprising:
a plastic tool connector head with a back side and a nose;
a generally square shaft guide with four orthogonal walls formed within said head and opening at the distal end of the nose;
a square shaft with a diameter less than said shaft guide having a free end;
a first and second of raised section forming plastic bumps extending from walls of said shaft guide into the shaft guide whereby a portion of the shaft guide near the location of each raised section is diminished;
upon insertion of the shaft into the shaft guide each bump a tool with a metal shaft pressure fit against the residuals in said shaft guide; and,
whereby upon insertion of said free end into the shaft guide a portion of each of said raised sections is removed by the free end forming a pressure fit between the residual of the plastic bumps, shaft guide and shaft.

12. The tool mounting system of claim 11 further comprising a first well in said shaft that catches and retains the residual of the raised sections.

13. The tool mounting system of claim 12, further comprising:
   a first well in said shaft that catches and retains the residual of said first raised section; and,
   a second well in said shaft that catches and retains the residual of said second raised section.

* * * * *